(12) United States Patent
Maynor

(10) Patent No.: US 11,766,319 B2
(45) Date of Patent: Sep. 26, 2023

(54) DE ' POLISHOR

(71) Applicant: Mackie Maynor, Desoto, TX (US)

(72) Inventor: Mackie Maynor, Desoto, TX (US)

( * ) Notice: Subject to any disclaimer, the term of this patent is extended or adjusted under 35 U.S.C. 154(b) by 106 days.

(21) Appl. No.: 17/300,162

(22) Filed: Apr. 7, 2021

(65) Prior Publication Data

US 2022/0323187 A1 Oct. 13, 2022

(51) Int. Cl.
*A61C 17/26* (2006.01)
*A61C 17/22* (2006.01)

(52) U.S. Cl.
CPC .......... *A61C 17/26* (2013.01); *A61C 17/221* (2013.01); *A61C 17/222* (2013.01)

(58) Field of Classification Search
CPC ...... A61C 17/26; A61C 17/221; A61C 17/222

USPC ....................................................... 15/167.1
See application file for complete search history.

(56) References Cited

U.S. PATENT DOCUMENTS

2016/0074143 A1* 3/2016 Addington .......... A61C 17/222
15/23

FOREIGN PATENT DOCUMENTS

KR         102064560 B1 * 1/2020

* cited by examiner

*Primary Examiner* — Katina N. Henson

(57) ABSTRACT

A distinguishing Tooth apparatus cleaning device with a tooth polisher figure, and a four sided black Technical Circular Brush with feelers, for cleaning teeth. A battery cleaning device provides users a highly enhanced method with toothpaste in brush stubbles area to better polish teeth. Further comprising, a cover for the brush with a light to view the brushing area of the mouth.

1 Claim, 5 Drawing Sheets

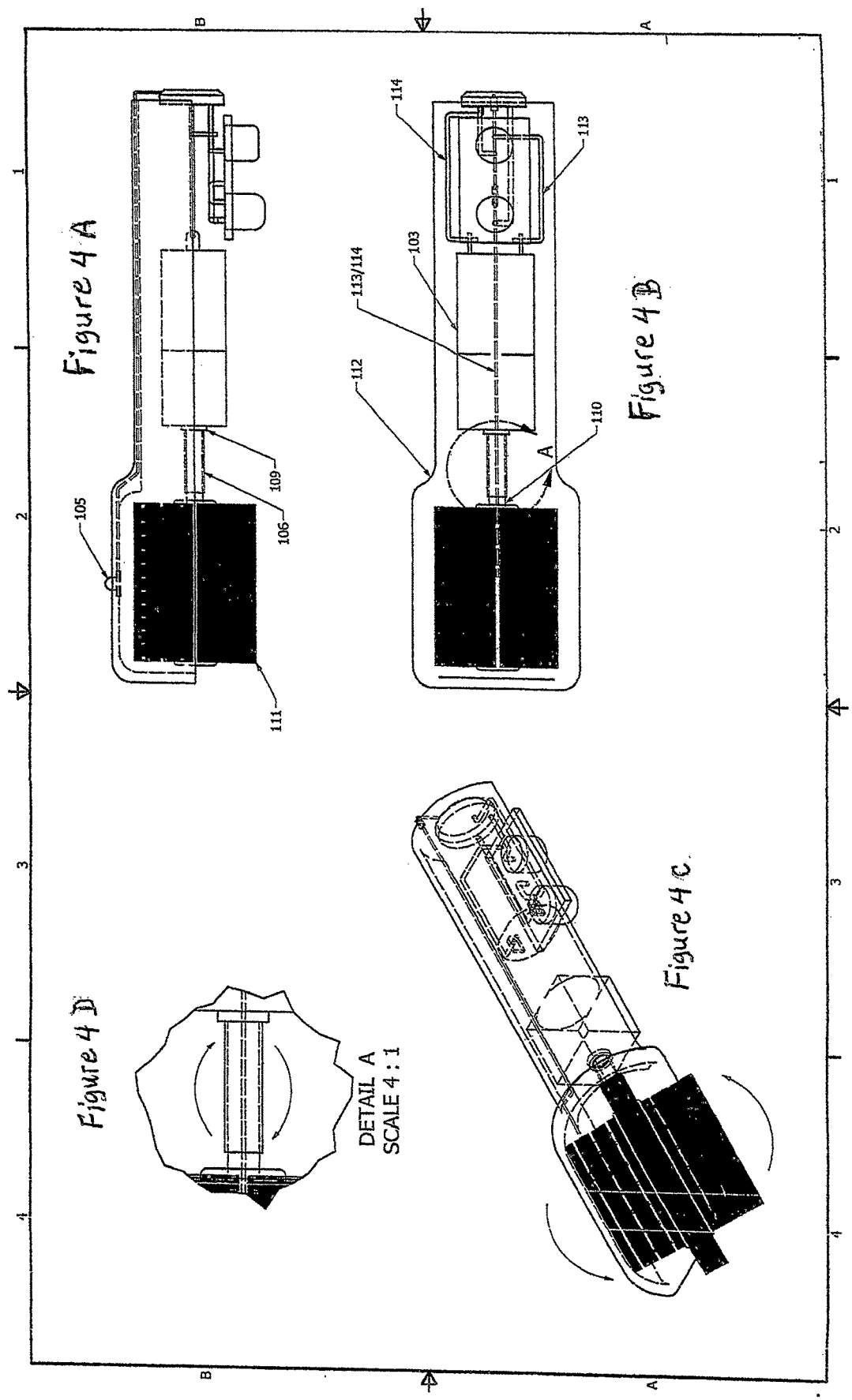

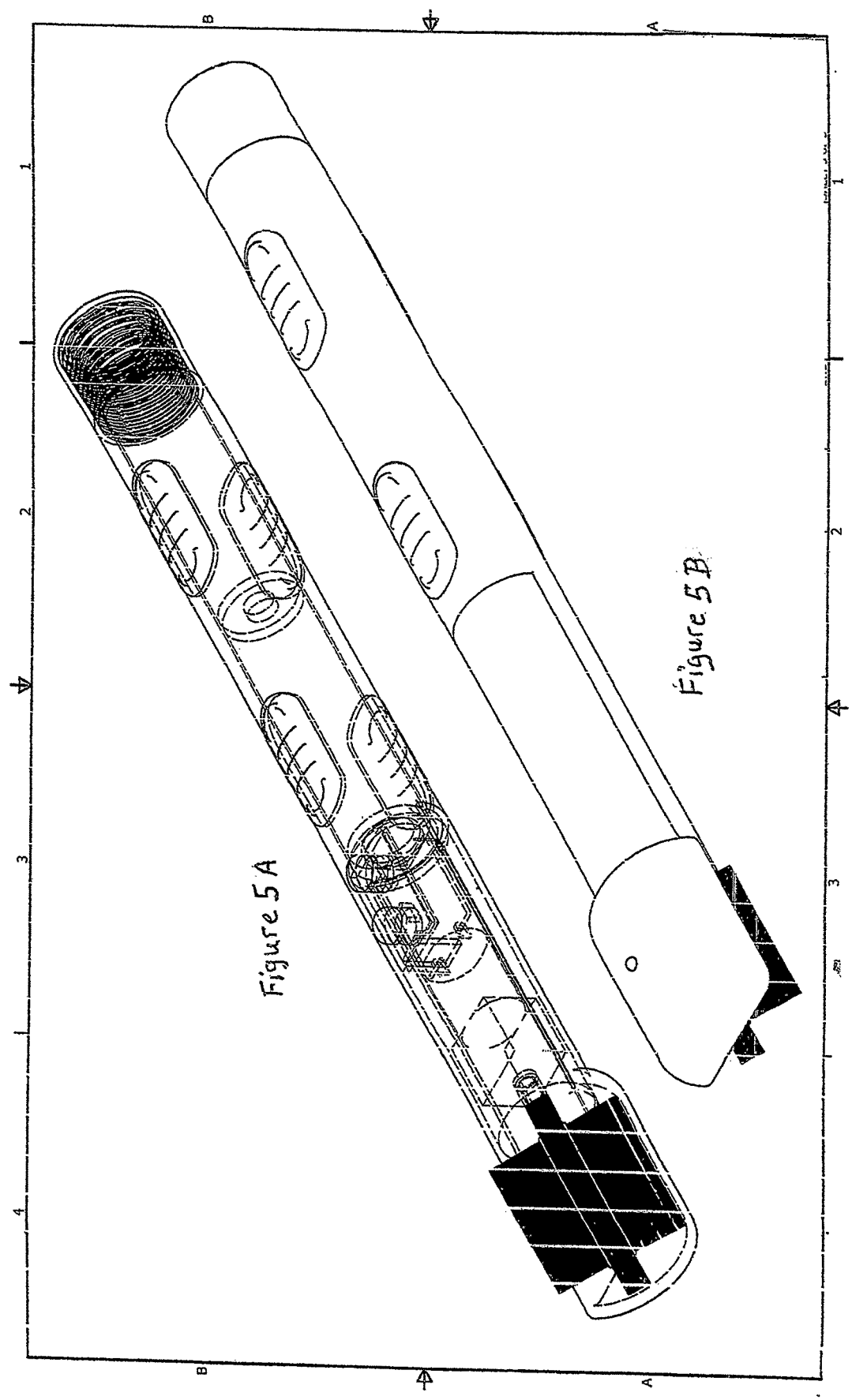

DE ' POLISHOR

BACKGROUND OF THE INVENTION

The Teeth and gums are a major factor in keeping clean and healthy. Good Hygiene plays a major role for mouth protection. Infections can start in the gums and teeth without proper brushing and periodontal disease can form suddenly without proper cleaning treatments of the mouth. Therefore, daily brushing is essential to avoid bacteria and germs. In consolably, people who have little time to arrange for appointment exams to care for their teeth are tied down with work or family matters. They must find ways to take better care of their teeth with good tools to keep clean teeth and p treatments. This is a sure way to keep healthy teeth for a long time. There is no prior art as such to the functional ways the polisher cleans upper and lower teeth.

CROSS REFERENCE TO RELATED APPLICATION the following application is somewhat related U.S. Pat. No. 2019/0290409AI, which was Filed Mar. 25, 2019. Also U.S. Patent Application Pub. No: WE 2020/0196871A1 Filed Dec. 17, 2019. And U.S. Pub. No. WE 2019/0174909A1 Filed Aug. 22, 2018. The entire disclosure of which is incorporated herein by reference.

FIELD OF THE INVENTION the presenting invention relates to oral care treatments of the teeth, also, to prevent Gingivitis or Pyorrhea Alveolar and, or Septicemia in the mouth. By spinning food and other particles away forward and backwards. The brush head man expanded pike staff of a toothbrush handle using a circulatory forte of a shaft housing and connector.

BRIEF SUMMARY OF THE INVENTION the following disclosure is for the sole purpose cleaning teeth with an electrical mechanical polisher. The product is studied to clean artificial or dental implants. The De'Polishor is a single hand held instrument powered by two single dry cell batteries. Durable to polish and clean teeth. Further more the De'Polishor is made of light strong durable plastic casing, black rubber grips to firmly hold in your hand without causing movement to prevent injury to the lip or gums: The unit has a three point module A. on the right directional cleaning. B. and press control module again to change directions to the left. C. last to stop the unit. Control light will come on to show mechanism is in operation. A small 1-2 horsepower motor which will turn the propel shaft of the four side brush. The brush has a protective cover to keep the tooth paste centered in the brushing location. The Four side whisk connects to a propel shaft which rotates clock wise to clean the outer portions of the teeth very clean. And the toothbrush will rotate counter clock wise to clean the inner teeth to their brightest. The characteristics of the contrivance are narrative and distinctly described in detail to the identification stated in the application.

BRIEF DESCRIPTION OF THE DRAWING

The figure illustrates the detailed description of the product, and methods of its uses. Also, discloses use to properly clean teeth.

The device also gives a clear picture of the major functions of this electrical polisher.

Figure 2:
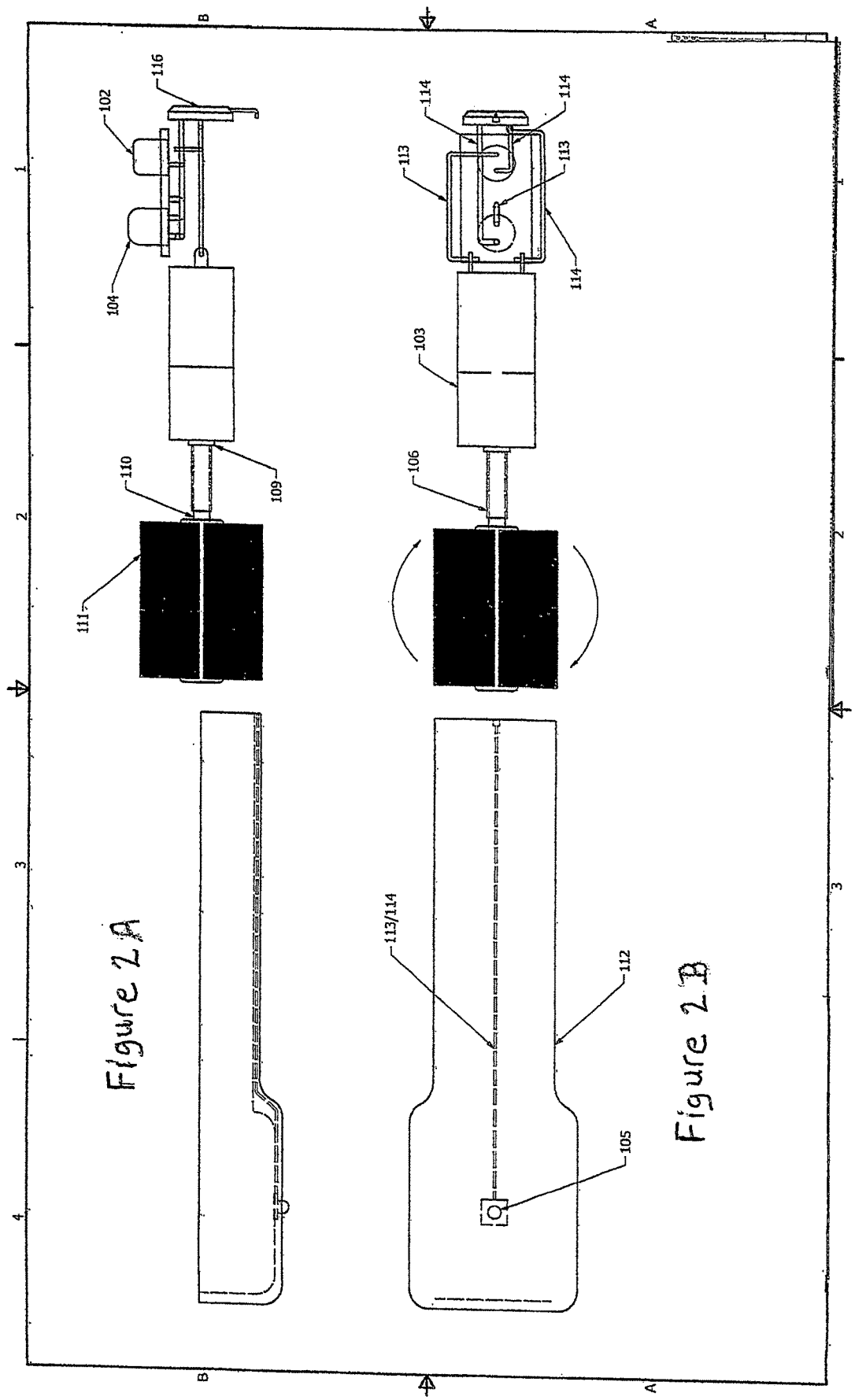

FIGS. 2 and 4 is a inner working component of the tooth brush, The De'Polishor, the clock wise rotation and counter clock wise brush movement rotations. Electrical wiring and control device with the working embodiment.

Figure 3:
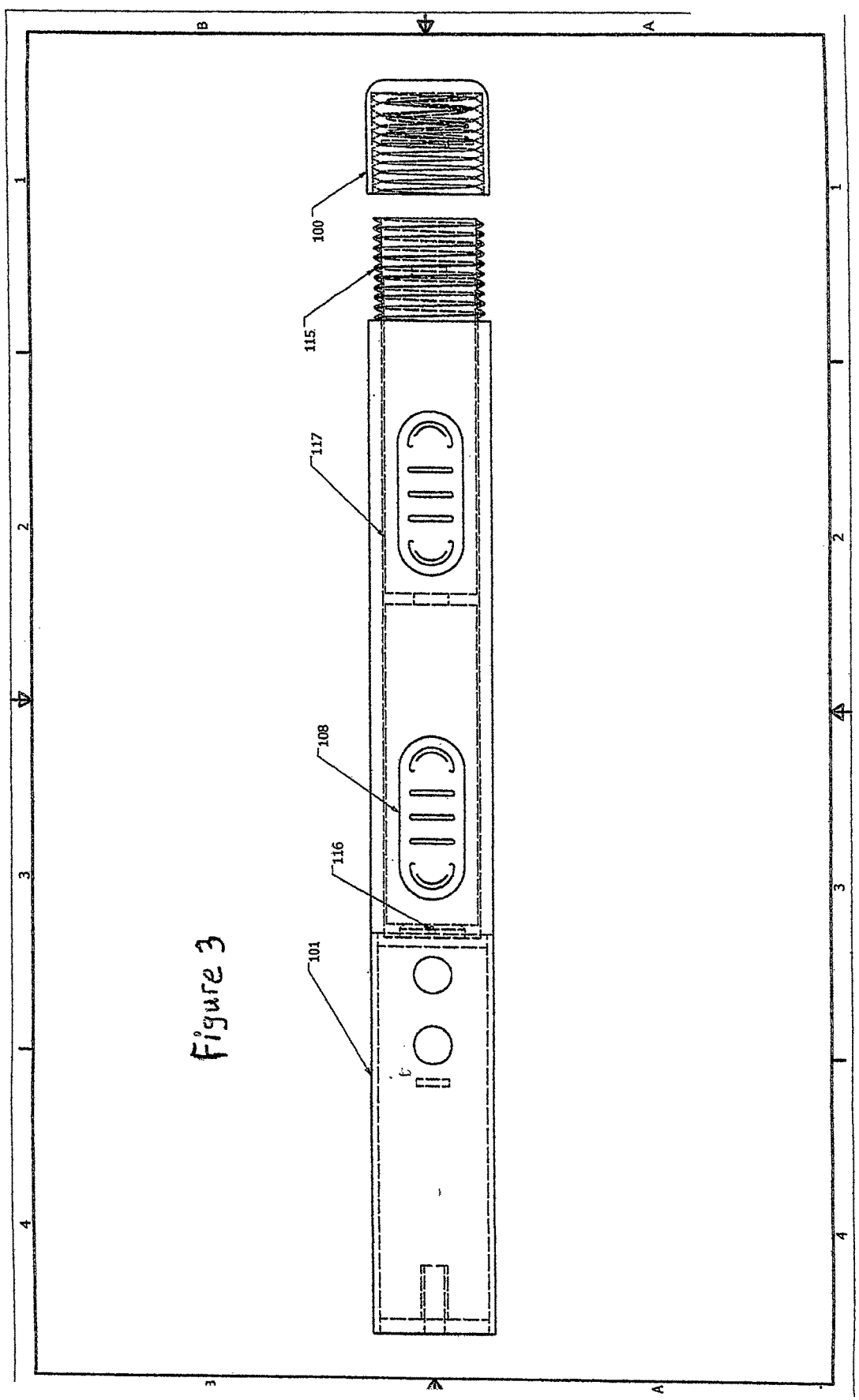

FIG. 3. is a larger view of the tooth polisher's electrical segment which includes the screw on cap which has a charge conductor to connect and make said module produce energizing current.

FIG. 5. is a front view of the circular motion of the polisher's front disk-like and counter clock wise circular motion, also, the main shaft connection to the motor inside the body component. With a larger graphic size with the four side rotation brush and it's protective cover.

Figure 1:
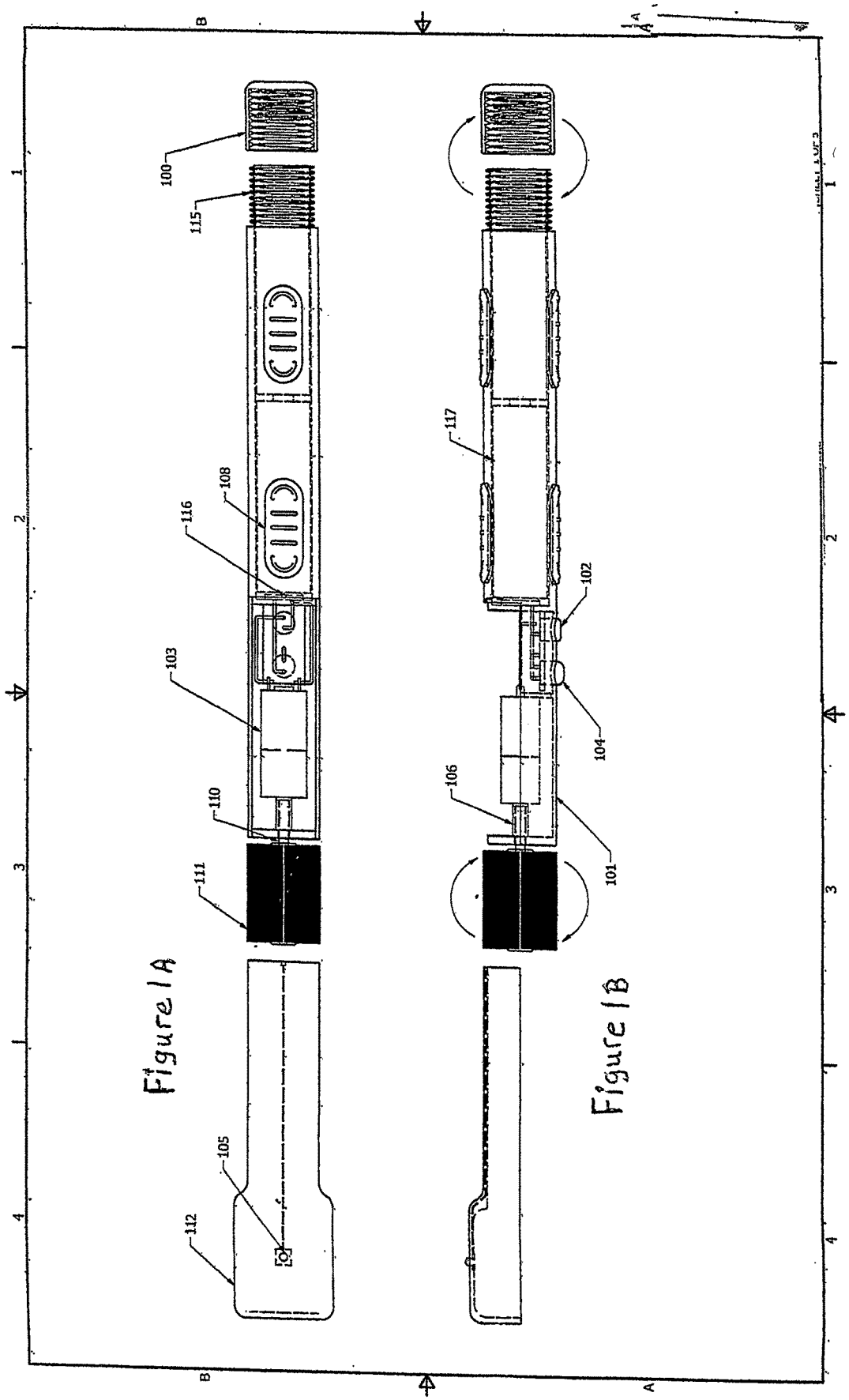
FIG. 1. is a side view of a battery operative electrical teeth cleaning apparatus device according to the revelation disclosure.

DETAILED DESCRIPTION OF DISCLOSURE as reviewed above, the epitome of the current mechanism describes a teeth cleaning apparatus and better hygiene care for the teeth. Overall, shown is a battery operated polisher which has capabilities to develop better oral health care. References towards drawings is application by number references, FIG. 1-5 views of an electrical operative tooth cleaning device starts at item 099-118. FIG. 1. as shown, a gadget implement use to release stains from the teeth.

FIG. 1. is a Body cartridge shown. Comprising a module control 102, Which is the main power brain for function. The Polisher also, consists of operation light 104, 103 motor to the shaft housing and connector 106. Further, constitutes 110 brush shaft. The container holds two-direct current batteries. Item 117 of FIG. 4. And as FIG. 1. Electrical current flows from item 117 of FIG. 4. To the motor item 103. of FIG. 1 and item 103 turns shaft 106 of FIG. 4. and FIG. 1. It is connected to the brush head of item 111 of FIG. 1. And of FIG. 4 connects with 109 screw nut.

FIG. 2. is showing a left side view of the cover 112 which connects to brush, motor, and bottom of the polisher unit device 101. The tooth cleaner gadget 099 in it's inner mechanisms, batteries 117, power source to send electrical current to the motor 103. Which connects to operation light 104. That shows the rotational brush 111 to rotate clock wise or counter clockwise to clean teeth connected with 112 brush cover protects interior of the mouth The polisher comprises of all items mentioned in FIG. 2. Yet, the cleaner do have a long life span to clean and shine teeth.

FIG. 3. Illustrates the inner module control 102 which has three controls levels, forward motion, rear motion, and on/off mechanism on the polisher body. 101 connects to 100 screw cap that fits to the top threads of polisher body to secure batteries for operation of said device. Items 117 and 118 the wiring connects to 116 battery receptor which sends power to 103 motor not pictured here by 102 control module.

FIG. 3. shows the left side context, 100 screw on lid cap, which assembled 101 polisher's body with 108 rubber finger grips for firm support of your fingers while using this product. 116 battery receptor connects to 113 positive electrical current to the motor 103. not pictured here supports from 117 battery receptor.

FIG. 5. an inner left side view of 103 motor 107 motor bolts to attached to 101 polisher's body frame. A front view of 112 protective brush cover and 111 rotational brush illustrates the counter and clock wise motion of 111 rotational brush.

What I claim is:

1. A voltaic tooth brush consisting of a body cartridge, a connector, a cover and a module control; the module control further consisting of an operational light and a motor; wherein the motor connects to a brush shaft; and the brush shaft connects to a brush head by the connector; the brush head consists of 4 equal sides making up a whisk; wherein the motor connects to a power source; the power source consisting of two batteries; the batteries being housed in a battery receptor; wherein the batteries of the batter receptor connects to the motor to send positive electrical currents to the motor; wherein the body cartridge further consists of a screw cap with threads; the screw cap with threads attached to the body cartridge by top end threads of the body cartridge; wherein the body cartridge further consists of black rubber grips embedded on the body cartridge to keep resistant in a hand of a user while the voltaic tooth brush is in use.

\* \* \* \* \*